(12) United States Patent
Yang

(10) Patent No.: US 10,372,254 B2
(45) Date of Patent: Aug. 6, 2019

(54) FORCE TOUCH ASSEMBLIES, FORCE DETECTION METHODS, DRIVING METHODS AND DISPLAY DEVICES

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Qing Yang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 0 days.

(21) Appl. No.: 15/573,437

(22) PCT Filed: Apr. 10, 2017

(86) PCT No.: PCT/CN2017/079929
§ 371 (c)(1),
(2) Date: Nov. 10, 2017

(87) PCT Pub. No.: WO2017/202148
PCT Pub. Date: Nov. 30, 2017

(65) Prior Publication Data
US 2018/0246610 A1     Aug. 30, 2018

(30) Foreign Application Priority Data
May 27, 2016   (CN) .......................... 2016 1 0365786

(51) Int. Cl.
*G06F 3/041*     (2006.01)
*G06F 3/044*     (2006.01)

(52) U.S. Cl.
CPC ............ *G06F 3/0414* (2013.01); *G06F 3/044* (2013.01); *G06F 3/0412* (2013.01); *G06F 2203/04103* (2013.01); *G06F 2203/04105* (2013.01)

(58) Field of Classification Search
CPC .................. G06F 3/0414; G06F 3/044; G06F 2203/04105; G06F 3/0412; G06F 2203/04106
See application file for complete search history.

(56) References Cited

U.S. PATENT DOCUMENTS

2013/0016059 A1\* 1/2013 Lowles ................... G06F 3/016
                                                                345/174
2013/0249859 A1  9/2013 Park et al.
(Continued)

FOREIGN PATENT DOCUMENTS

CN        204926052 U    12/2015
CN        204965399 U    1/2016
(Continued)

OTHER PUBLICATIONS

International Search Report & Box V of Written Opinion, for PCT Patent Application No. PCT/CN2017/079929, dated Jun. 30, 2017, 21 pages.

(Continued)

*Primary Examiner* — Koosha Sharifi-Tafreshi
(74) *Attorney, Agent, or Firm* — Kinney & Lange, P.A.

(57) ABSTRACT

The embodiments provide a force touch assembly, a force detection method, a driving detection method and a display apparatus. The force touch assembly may comprise a substrate, a touch sensor and a force sensor provided on the substrate, and a back plate, wherein: the touch sensor is disposed on a first side of the substrate; the force sensor is disposed on a second side of the substrate opposite to the touch sensor, and configured to contact with the substrate;

(Continued)

and the back plate is disposed on a side of the force sensor opposite to the substrate, with a gap from the force sensor. The disclosure enables functional layers such as touch sensor and force sensor to be integrated on the same substrate, saving the carrier required for manufacturing the force sensor, reducing the thickness of the force touch assembly, enabling the integration of the assembly into a product having a higher physical strength, and further simplifying the process. The magnitude of the force can be detected based on a capacitor formed by the force sensor and the back plate.

12 Claims, 4 Drawing Sheets

(56) References Cited

U.S. PATENT DOCUMENTS

2015/0370396 A1* 12/2015 Hotelling .............. G06F 3/0414
  345/174
2016/0274708 A1* 9/2016 Hwang ................. G06F 3/0412
2017/0045992 A1* 2/2017 Lee ....................... G06F 3/0416
2017/0300146 A1* 10/2017 Han ...................... G06F 3/0414
2017/0357357 A1* 12/2017 Hinson ................. G06F 3/0414
2018/0307373 A1* 10/2018 Wang .................... G06F 3/044

FOREIGN PATENT DOCUMENTS

| CN | 205068355 U | 3/2016 |
| CN | 105511669 | 4/2016 |
| CN | 106066730 A | 11/2016 |
| CN | 106681571 A | 5/2017 |

OTHER PUBLICATIONS

Second Chinese Office Action, for Chinese Patent Application No. 201610365786.6, dated Jun. 14, 2018.

First Chinese Office Action, for Chinese Patent Application No. 201610365786.6, dated Dec. 28, 2017, 13 pages.

* cited by examiner

FORCE TOUCH ASSEMBLIES, FORCE DETECTION METHODS, DRIVING METHODS AND DISPLAY DEVICES

CROSS-REFERENCE TO RELATED APPLICATION(S)

This application is a U.S. National Phase Application of International Application No. PCT/CN2017/079929, filed on Apr. 10, 2017, entitled "FORCE TOUCH ASSEMBLIES, FORCE DETECTION METHODS, DRIVING METHODS AND DISPLAY DEVICES," which claims priorities to the Chinese Application No. 201610365786.6, filed on May 27, 2016, both of which are incorporated herein by reference in their entireties.

TECHNICAL FIELD

The present disclosure relates to the field of force touch technology, and more particularly to a force touch assembly, a force detection method, a driving method and a display device.

BACKGROUND

Currently, in 3D touch technology, more and more touch functions can be realized with a detection of a magnitude of a force. Meanwhile, by outputting different force feedbacks based on the magnitude of the force, it give users a better touch experience. It is expected that the 3D touch (Force Touch) will be widely used in consumer electronics.

SUMMARY

The present disclosure provides a force touch assembly, a force detection method, a driving method and a display device, which are capable of integrating two functional layers (i.e. the touch sensor and the force sensor) on the same substrate.

According to a first aspect of the disclosure, a force touch assembly is provided, which may comprise: a substrate, a touch sensor and a force sensor provided on the substrate, and a back plate, wherein:

the touch sensor is disposed on a first side of the substrate;

the force sensor is disposed on a second side of the substrate opposite to the touch sensor, and configured to contact with the substrate; and the back plate is disposed on a side of the force sensor opposite to the substrate, with a gap from the force sensor.

Preferably, the force touch assembly may further comprise a back light unit, wherein the back light unit is disposed on a side of the force sensor opposite to the substrate and is located between the force sensor and the back plate, with a gap from the force sensor.

Preferably, the force sensor may be a self-capacitance sensing block array.

Preferably, the force touch assembly may further comprise: a display switch disposed on the first side of the substrate.

Preferably, the force touch assembly may further comprise a driver IC.

The driver IC is disposed on the first side of the substrate and is located in a non-display area of the force touch assembly. The driver IC is electrically coupled to the display switch, the touch sensor and the force sensor, and configured to drive the display switch, the touch sensor and the force sensor by time division.

Preferably, the force touch assembly may further comprise a connection Flexible Printed Circuit (FPC) and a master FPC. The connection FPC is coupled to a lead wire of the force sensor and coupled to the master FPC.

The master FPC is coupled to the driver IC, so as to connect the lead wire of the force sensor to a corresponding pin of the driver IC.

Preferably, the force touch assembly may further comprise a connection FPC. The connection FPC is coupled to a lead wire of the force sensor and coupled to a bonding area of the substrate, so as to connect the lead wire of the force sensor to a corresponding pin of the driver IC through the bonding area of the substrate.

According to a second aspect of the disclosure, a force touch detecting method for any of the above force touch assemblies is provided, which may comprise:

applying a force detecting signal to the force sensor, at a force detecting stage;

detecting a change in a capacitance of a capacitor composed of the force sensor and the back plate; and obtaining a magnitude of the force according to the change in the capacitance of the capacitor.

According to a third period of the disclosure, a method for driving any of the above force touch assemblies is provided, which may comprise:

driving the display switch to operate during a first preset period;

driving the touch sensor to operate during a second preset period; and driving the force sensor to operate during a third preset period;

wherein the first preset period, the second preset period and the third preset period are not coincident with each other.

Preferably, the first preset period is within the display time of a Liquid Crystal Display (LCD); and the second preset period and the third preset period are within a blanking time of the LCD.

According to a fourth aspect of the disclosure, a display device comprising any of the above force touch assemblies is provided.

BRIEF DESCRIPTION OF THE DRAWINGS

In order to illustrate embodiments of the present disclosure or the prior art, drawings which are used in the description of the embodiments or the prior art will be briefly described herein. It will be apparent that the drawings in the following description are merely some of embodiments of the present disclosure, those skilled in the art would obtain other drawings without departing from the inventive.

DETAILED DESCRIPTION

The embodiments of the present disclosure will now be described in conjunction with the accompanying drawings in the present disclosure. It will be apparent that the described embodiments are merely part of the embodiments of the present disclosure and not all of the embodiments. All other embodiments obtained by those of ordinary skill in the art without making creative work are within the scope of this disclosure, based on the embodiments of the present disclosure.

Figure 1:
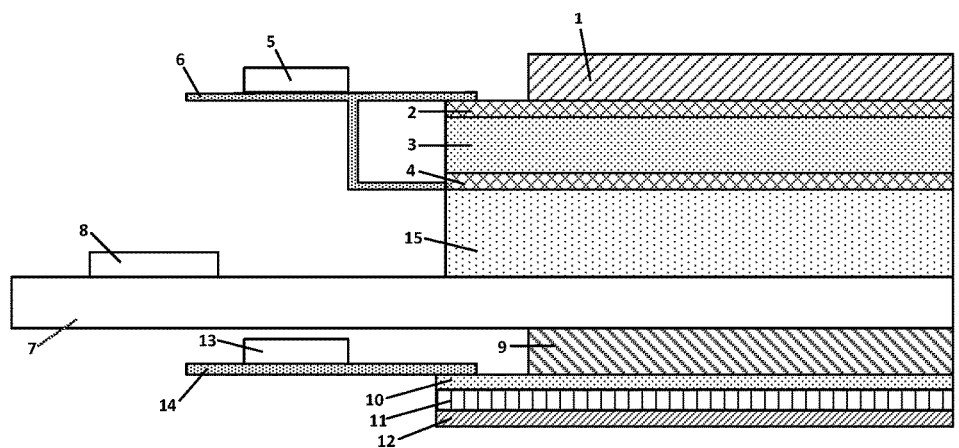
FIG. 1 is a schematic view of a structure of a force touch assembly.

FIG. 1 is a schematic view of a structure of a force touch assembly. As shown in FIG. 1, the force touch assembly may comprise an upper polarizer 1, a touch sensor Tx (Rx) ITO layer 2, a color film substrate 3, a touch sensor Rx (Tx) ITO layer 4, a touch driver IC 5, a touch FPC 6, an LCD array substrate 7, an LCD driver IC 8, a lower polarizer 9, a force sensor 10, a sensor carrier 11, a shield layer 12, a force sensor driver IC 13, a force sensor FPC 14 and a liquid crystal layer 15. It can be seen from FIG. 1 that the force sensor 10, the sensor carrier 11, and the shield layer 12 are provided on a side of the lower polarizer 9 opposite to the substrate.

Thus, in order to achieve the touch function, there is a need to add an additional force sensor and its driver IC and also peripheral circuits, causing an increase in the cost and also an increase in the thickness of the device, which is undesired. Besides, the separate design of the touch sensor and the force sensor makes the force touch assembly and its manufacturing process more complex.

Figure 2:
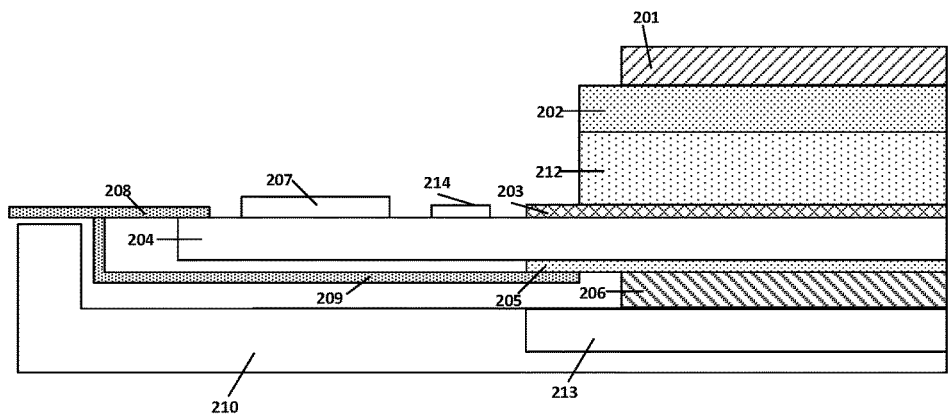
FIG. 2 is a schematic cross-sectional view of a force touch assembly according to an embodiment of the present disclosure.

FIG. 2 is a schematic cross-sectional view of a force touch assembly according to an embodiment of the present disclosure. As shown in FIG. 2, the force touch assembly includes a substrate 204, a touch sensor 203 and a force sensor 205 provided on the substrate 204, and a back plate 210.

The touch sensor 203 may be disposed on a first side of the substrate 204. The force sensor 205 may be disposed on a second side of the substrate 204 opposite to the touch sensor 203, and configured to contact with the substrate 204. The back plate 210 may be disposed on a side of the force sensor 205 opposite to the substrate 204, with a gap from the force sensor. In an embodiment of the disclosure, the substrate 204 may be an array substrate of a display device.

It should be noted that the touch sensor 203 is provided on the first side of the substrate 204 in the present embodiment, and may be provided in the same manner as in the prior art. For example, a touch sensor may comprise two layers of ITO, which function as a touch electrode and a sensing electrode of a touch sensor, respectively. A plurality of sensing electrodes and a plurality of touch electrodes are provided in a cross and insulated manner.

Thus, the force touch assembly according to the embodiment may comprise a substrate, a touch sensor and a force sensor provided on the substrate, and a back plate. By disposing the touch sensor 203 on a first side of the substrate 204, and disposing the force sensor 205 on a second side of the substrate 204, functional layers such as the touch sensor 203 and the force sensor 205 both may be integrated on the same substrate 204, thereby reducing a carrier (glass or PET) required for manipulating the force sensor. In this way, the thickness of the force touch assembly may be reduced, enabling the integration of the assembly into a product having a higher physical strength, which may further simplify the process. Further, based on the structure of the force touch assembly, the force sensor and the back plate can be used as two plates of a force sensing capacitor. At a force detecting stage, a touch force acts to change the distance between the force sensor and the back plate, resulting in a change in a capacitance of a capacitor formed by the force sensor and the back plate. Thus, the magnitude of the touch force can be obtained by detecting the change in the capacitance between the force sensor and the back plate.

Alternatively, the force touch assembly may further comprise a back light unit 213.

The back light unit 213 is disposed on a side of the force sensor opposite to the substrate and is located between the force sensor and the back plate, with a gap from the force sensor 205.

Accordingly, the force sensor of the above embodiment may be a self-capacitance sensing block array.

Figure 4:
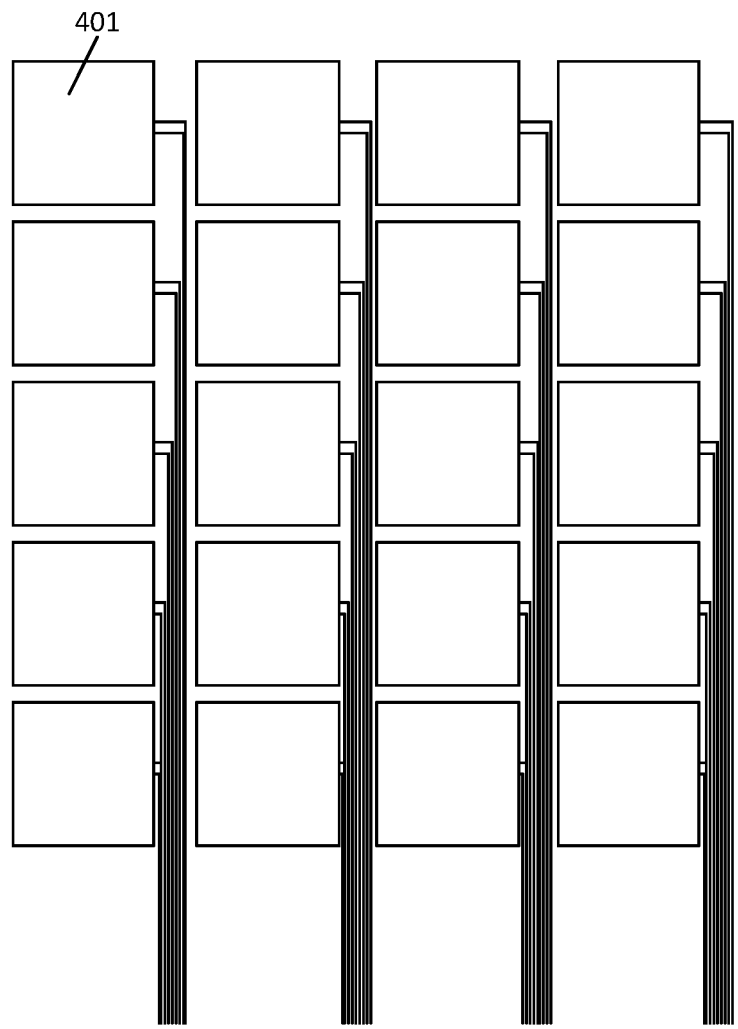
FIG. 4 is a schematic diagram illustrating a self-capacitance sensing block array according to another embodiment of the present disclosure.

Specifically, as shown in FIG. 4, the self-capacitance sensing block array comprises a plurality of force sensing blocks 401 arranged in an array. Each of the plurality of force sensing blocks serves as a plate of a capacitor. When an external force is applied, the force sensor deforms. Due to the change of the gap between the force sensing block and the back light unit (BLU), the electric field changes, so that the force sensing block may sense the change in the self-capacitance. Thus, the self-capacitance sensing block array can sense the change in the capacitance caused by the deformation sensitively.

Alternatively, the force touch assembly further comprises a display switch 214 disposed on the first side of the substrate. In other words, the display switch 214 (such as a thin film transistor) is disposed on the same side of the substrate as the touch sensor, so as to control the display of the force touch assembly.

Thus, in the embodiment, three functional layers, i.e., the display switch, the touch sensor and the force sensor are integrated on the same substrate, such that the integration of the force touch assembly can be increased, resulting in reduction of the thickness, enabling the assembly to be integrated in a product with a higher physical strength and simplifying the process.

Alternatively, as shown in FIG. 2, the force touch assembly may further comprise a driver IC 207.

In particular, the driver IC 207 is disposed on the first side of the substrate 204 (i.e. the side on which the touch sensor 203 is disposed) and is located in a non-display area of the force touch assembly.

Further, the driver IC 207 is electrically coupled to the display switch 214, the touch sensor 203 and the force sensor 205, and configured to drive the display switch 214, the touch sensor 203 and the force sensor 205 by using a time-division scanning algorithm.

Therefore, the driver IC 207 according to the present embodiment is capable of driving the display switch 214, the touch sensor 203 and the force sensor 205 to operate in different time. That is, the driver IC 207 achieves a function of display driving and a function of scanning of the touch sensor and the force sensor. The present embodiment enables the three layers to operate in an independent and time-division manner by using a time-division driving method, without the need for setting a LCD driver IC, a force sensor Driver IC and a touch sensor driver IC independently as in prior art. Thus, the present embodiment enables the thickness of the force touch assembly to be further reduced and the structure of the force touch assembly to be further simplified, thereby simplifying the production process and improving the efficiency.

Figure 3:
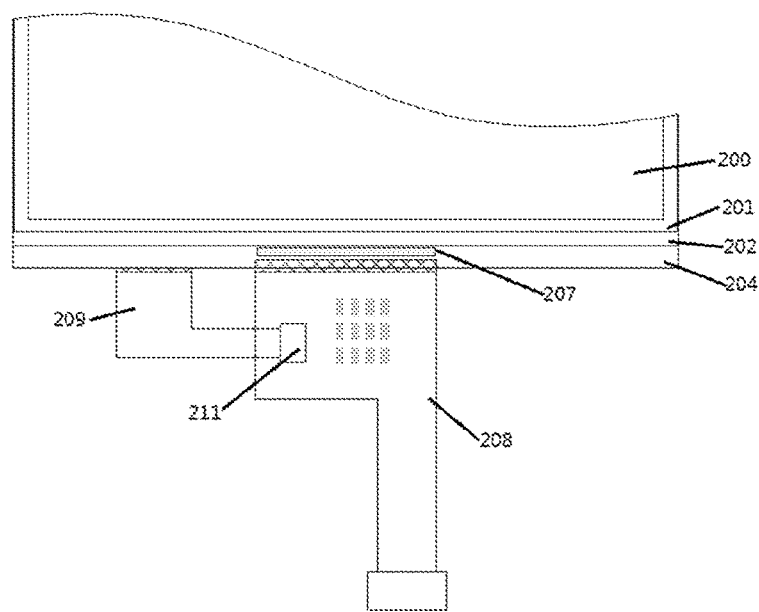
FIG. 3 is a top view illustrating a force touch assembly according to another embodiment of the present disclosure.

Further, an alternative embodiment of the disclosure is shown in FIGS. 2 and 3. FIG. 2 is a schematic cross-sectional view of a force touch assembly according to an embodiment of the present disclosure, and FIG. 3 is a top view illustrating a force touch assembly of FIG. 2. As shown in FIG. 2, in addition to the components discussed above, the force touch assembly may further comprise a connection Flexible Printed Circuit (FPC) 209 and a master FPC 208.

The connection FPC 209 is coupled to a lead wire of the force sensor 205 and coupled to the master FPC 208.

The master FPC 208 is coupled to the driver IC 207, so as to connect the lead wire of the force sensor 205 to a corresponding pin of the driver IC 207.

It should be noted that a display area 200 is shown in FIG. 3, and the connection flexible printed circuit (FPC) 209 and the master FPC 208 are disposed in the non-display area of the force touch assembly. In particular, as shown in FIG. 3, the connection FPC 209 and the master 208 is connected through a plug connector 211.

It can be seen that in this embodiment, the lead wire of the force sensor 205 is bonded to a connection FPC 209, which is coupled to the master FPC 208 after being bended. The master FPC 208 connects the lead wires to corresponding pins of the driver IC 207. In this way, the force sensor 205 and the driver IC 207 are connected by the connection FPC 209 and the master FPC 208. Thus, the control of driving of the force sensor 205 via the driver IC 207 can be realized.

Alternatively, in an embodiment of the disclosure, the force touch assembly further comprises a connection FPC.

The connection FPC is coupled to a lead wire of the force sensor and coupled to a bonding area of the substrate, so as to connect the lead wire of the force sensor to a corresponding pin of the driver IC through the bonding area of the substrate.

In the embodiment, the lead wire of the force sensor 205 is bonded to a connection FPC, wherein the connection FPC is bonded to a bonding area of the substrate at the same side of the substrate as the touch sensor after being bended, thereby connecting the lead wire to a corresponding pin of the diver IC through the bonding area of the substrate. In this way, the embodiment may enable the force sensor and the driver IC to be connected by the connection FPC. Thus, the control of driving of the force sensor via the driver IC can be realized.

Further, as shown in FIG. 2, in addition to the components of above embodiments, the force touch assembly may further comprise a color film substrate 202, a liquid crystal layer 212, an upper polarizer 201 and a lower polarizer 206.

In particular, the liquid crystal layer 212 is disposed on a side of the touch sensor 203 opposite to the substrate 204. The color film substrate 202 is disposed on a side of the liquid crystal layer 212 opposite to the touch sensor 203. The upper polarizer 201 is disposed on a side of the color film substrate 202 opposite to the liquid crystal layer 212. The lower polarizer 206 is disposed on a side of the force sensor 205 opposite to the substrate 204.

It should be noted that in the present embodiment, the lower polarizer 206 is located between the force sensor 205 and the back plate 210, so as to enable a gap between the force sensor 205 and the back plate 210 and use as an insulating layer between two plates of a capacitor.

In contrast to the prior art, in the present embodiment, three functional layers, i.e., the display switch, the touch sensor and the force sensor are integrated on the same substrate. Independent operations of the three layers can be achieved by driving of one driver IC in a time-division manner. Thus, the magnitude of the force touch can be determined by detecting a change in the gap between the force sensor and the back plate. Since the size of the gap will be changed due to the deformation caused by the force touch, a change in the capacitance of the capacitor formed by the force sensor and the back plate can be detected, thereby the magnitude of the force touch can be obtained according to the change of the capacitance.

Figure 5:
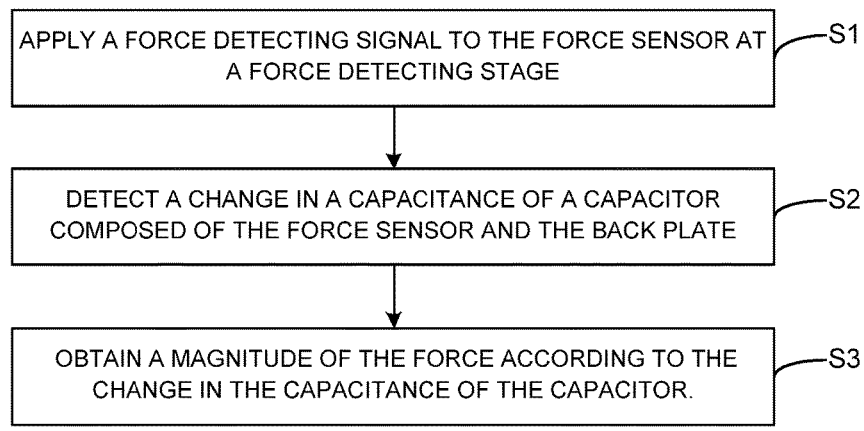
FIG. 5 is a flow chart of a touch force detection method according to an embodiment of the present disclosure.

FIG. 5 is a touch force detection method for the force touch assembly of any of above embodiments of the present disclosure. As shown in FIG. 5, the method may comprise the steps of:

S1: applying a force detecting signal to the force sensor, at a force detecting stage;

S2: detecting a change in a capacitance of a capacitor composed of the force sensor and the back plate;

In particular, from an equation of a plate capacitor, i.e. $C=(\xi \cdot S)/d$ it is known that the capacitance of the capacitor formed by the force sensor and the back plate changes if the distance between the force sensor and the back plate changes. The change in the capacitance can be detected.

S3: obtaining a magnitude of the force according to the change in the capacitance of the capacitor.

For an example, in the force touch assembly as shown in FIG. 2, the external force cause a change in the gap between the touch sensor 205 and the back plate 210, i.e. a change of distance, which further causes a change in capacitance detectable by the force sensor 205. The magnitude of the force can be calculated according to the detected change in the capacitance, so as to determine the force used by the touch.

In addition, in the case that the force sensor is a self-capacitance sensing block array, and the self-capacitance sensing block array is formed by a plurality of force sensing blocks arranged in an array, if the force sensor is deformed by an external force, the electric field between the force sensing blocks changes, so that the force sensing block may detect the change in the capacitance. Furthermore, the magnitude of the touch force can be obtained according to the change in the capacitance.

Another embodiment of the disclosure may provide a method for driving the force touch assembly of any of above embodiments, comprising steps of: driving the display switch to operate during a first preset period; driving the touch sensor to operate during a second preset period; and driving the force sensor to operate during a third preset period, based on a time-division scanning algorithm.

It should be noted that the first preset period, the second preset period and the third preset period are not coincident with each other. Thus, by using such a driving method, the display switch, the touch sensor and the force sensor can operate in an independent and time division manner.

For example, the time-division driven scanning algorithm may include in a period of scanning a frame of a Liquid Crystal Display (LCD), driving the display switch (such as, a thin film transistor) to operate during a display time of the LCD; and driving the touch sensor and the force sensor to operate during a blanking time of the LCD.

Figure 6:
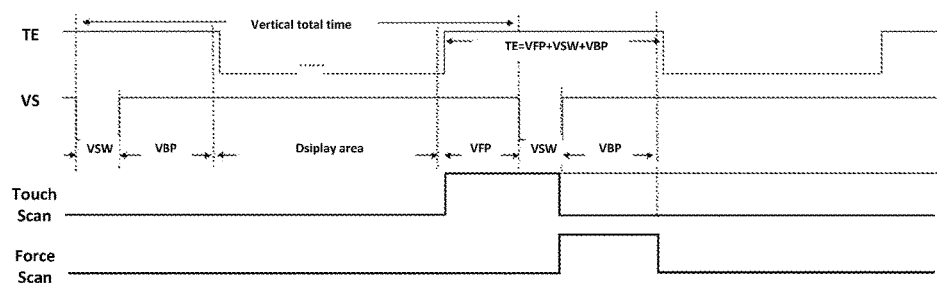
FIG. 6 is a schematic diagram of a time-division driven scanning signal according to another embodiment of the present disclosure.

For example, FIG. 6 shows time-division scanning signals, where VS denotes a frame synchronization signal, TE denotes an enabling signal, "Touch Scan" signal denotes a scanning signal for driving the touch sensor, and "Force Scan" signal denotes a scanning signal for driving the force sensor. An interval between the rising edge of the frame synchronization signal VS and the falling edge of the enabling signal TE is VBP, and an interval between the rising edge of the enabling signal TE and the falling edge of the frame synchronization signal VS is VFP. A duration of a low level of the frame synchronization signal VS (which is non-effective) is referred to as VSW. It can be seen from FIG. 6 that in a vertical total time of scanning a frame of the LCD, the thin transistor is driven to operate during the display time of the LCD (TE is at a low level), and the touch sensor and the force sensor are driven to operate during the blanking time of the LCD (TE is at a high level).

It should be noted that the operations of LCD display+ Touch scan+Force scan should be completed in the period of one frame of a LCD, wherein the Touch scan and the Force scan are performed during the LCD Blanking period. When the Force scan is performed, the touch sensor is used as a shield layer which is capable of shielding the noise. Meanwhile, the detection direction of the force sensor is made to be downward, thus, detecting the change in the gap between the force sensor and the back light unit. During a period of a frame of the LCD, the Force scan can be performed before or after the Touch scan, which is not limited in the present embodiment.

In accordance with the same inventive concept, an embodiment of the present disclosure provides a display device comprising any of the above described force touch assemblies. The display device may be a liquid crystal display panel, a mobile phone, a tablet computer, a television set, a notebook, a digital photo frame, a navigator, or any product or component having a function of displaying and touch force sensing. Since the display device is a display device comprising any one of the above-described force touch assemblies, it can solve the same technical problem as the force touch assembly, and may have the same technical effect.

In the description of the present disclosure, it is to be noted that the azimuth or positional relationship indicated by the terms "upper", "lower", etc. is based on the azimuth or positional relationship shown in the drawings only for facilitating in describing the present disclosure and simplifying the description, rather than indicating or implying that the device or element referred to must have a specific orientation, must be constructed and operated in a particular orientation. Therefore, the terms cannot be construed as limiting the disclosure. Unless otherwise indicated or defined, the terms of "install", "coupled to", and "connected with" should be understood in general. For example, it may be connected/coupled fixedly or detachably or integrally; alternatively, it may be connected/coupled mechanically or electrically; or it may be connected/coupled directly or indirectly connected/coupled through an intermediate medium, or be an internal connectivity between two components. The specific meaning of the above terms in the present disclosure may be understood by those of ordinary skill in the art in light of specific circumstances.

It should also be noted that, in this context, relational terms such as "first," "second," and the like used herein may be used to distinguish one element from another element, which does not indicate or imply that any such actual relationship or order exists between these entities or operations. Moreover, the term "comprising" or "including" or any other variant thereof is intended to encompass a non-exclusive inclusion, such that the process, method, article, or device that includes a series of elements includes not only those elements but also elements that are not explicitly listed or other elements that are inherent to such processes, methods, articles, or equipment. In the absence of more restrictions, the elements defined by the statement "including a . . . " do not preclude the presence of additional elements in the process, method, article, or device that includes the elements.

The foregoing embodiments are merely illustrative of the technical aspects of the present disclosure and are not intended to be limiting thereof. Although the present disclosure has been described in detail with reference to the foregoing embodiments, it will be understood by those of ordinary skilled in the art that all modifications or modified forms derived based on the technical ideas of the present disclosure are included within the scope of the present disclosure, without departing from the spirit of the disclosure.

I claim:

1. A force touch assembly, comprising:
   a substrate, a touch sensor and a force sensor provided on the substrate, a back plate, a display switch and a driver IC, wherein:
   the touch sensor is disposed on a first side of the substrate;
   the force sensor is disposed on a second side of the substrate opposite to the touch sensor, and is configured to contact with the substrate; the back plate is disposed on a side of the force sensor opposite to the substrate, with a gap from the force sensor;
   the driver IC is disposed on the first side of the substrate and is located on a non-display area of the force touch assembly; and
   the driver IC is electrically coupled to the display switch, the touch sensor and the force sensor, and configured to drive the display switch, the touch sensor and the force sensor by time division.

2. The force touch assembly of claim 1, wherein the force touch assembly further comprises a back light unit.

3. The force touch assembly of claim 2, wherein the force sensor is a self-capacitance sensing block array.

4. The force touch assembly of claim 1, wherein the force touch assembly further comprises a connection Flexible Printed Circuit (FPC) and a master FPC;
   wherein the connection FPC is coupled to a lead wire of the force sensor and coupled to the master FPC; and
   wherein the master FPC is coupled to the driver IC, so as to connect the lead wire of the force sensor to a corresponding pin of the driver IC.

5. The force touch assembly of claim 1, wherein the force touch assembly further comprises a connection FPC; and
   wherein the connection FPC is coupled to a lead wire of the force sensor and coupled to a bonding area of the substrate, so as to connect the lead wire of the force sensor to a corresponding pin of the driver IC through the bonding area of the substrate.

6. A method for driving a force touch assembly comprising:
   a substrate, a touch sensor and a force sensor provided on the substrate, a back plate a display switch and a driver IC, wherein the touch sensor is disposed on a first side of the substrate;
   the force sensor is disposed on a first side of the substrate;
   the force sensor is disposed on a second side of the substrate opposite to the touch sensor, and configured to contact with the substrate;
   the back plate is disposed on a side of the force sensor opposite to the substrate, with a gap from the force sensor, and the driver IC is disposed on the first side of the substrate and is located in a non-display area of the force touch assembly, the method comprising:
   driving the display switch to operate during a first preset period;
   driving the touch sensor to operate during a second preset period; and
   driving the force sensor to operate during a third preset period;

wherein the first preset period, the second preset period and the third preset period are not coincident with each other, wherein the driver IC is electrically coupled to the display switch, the touch sensor and the force sensor, and configured to perform the method.

7. The method of claim 6, wherein:
the first preset period is within the display time of a Liquid Crystal Display (LCD); and
the second preset period and the third preset period are within a blanking time of the LCD.

8. A display device comprising a force touch assembly, wherein the force touch assembly comprises a substrate, a touch sensor and a force sensor provided on the substrate, a back plate, a display switch and a driver IC,
the touch sensor is disposed on a first side of the substrate;
the force sensor is disposed on a second side of the substrate opposite to the touch sensor, and configured to contact with the substrate; and
the back plate is disposed on a side of the force sensor opposite to the substrate, with a gap from the force sensor,
the driver IC is disposed on the first side of the substrate and is located in a non-display area of the force touch assembly; and
the driver IC is electrically coupled to the display switch, the touch sensor and the force sensor, and configured to drive the display switch, the touch sensor and the force sensor by time division.

9. The force touch assembly of claim 1, wherein the substrate is an array substrate.

10. The method of claim 6, wherein the force touch assembly further comprises a connection Flexible Printed Circuit (FPC) and a master FPC;
wherein the connection FPC is coupled to a lead wire of the force sensor and coupled to the master FPC; and
wherein the master FPC is coupled to the driver IC, so as to connect the lead wire of the force sensor to a corresponding pin of the driver IC.

11. The method of claim 6, wherein the force touch assembly further comprises a connection FPC; and
wherein the connection FPC is coupled to a lead wire of the force sensor and coupled to a bonding area of the substrate, so as to connect the lead wire of the force sensor to a corresponding pin of the driver IC through the bonding area of the substrate.

12. The display device of claim 8, wherein the force sensor is a self-capacitance sensing block array.

* * * * *